United States Patent
Kelly et al.

(10) Patent No.: US 10,007,612 B2
(45) Date of Patent: Jun. 26, 2018

(54) SYSTEMS AND METHODS FOR PRE-POPULATION OF GRAPHICS IMAGE CACHE IN VIRTUAL DESKTOP ENVIRONMENT

(71) Applicant: Dell Products L.P., Round Rock, TX (US)

(72) Inventors: John Kelly, Limerick (IE); Yinglong Jiang, Limerick (IE)

(73) Assignee: Dell Products L.P., Round Rock, TX (US)

( * ) Notice: Subject to any disclaimer, the term of this patent is extended or adjusted under 35 U.S.C. 154(b) by 0 days. days.

(21) Appl. No.: 14/919,391

(22) Filed: Oct. 21, 2015

(65) Prior Publication Data

US 2017/0116129 A1  Apr. 27, 2017

(51) Int. Cl.
G06F 12/08 (2016.01)
G06F 12/0875 (2016.01)
G06F 12/0888 (2016.01)

(52) U.S. Cl.
CPC ...... *G06F 12/0875* (2013.01); *G06F 12/0888* (2013.01); *G06F 2212/455* (2013.01)

(58) Field of Classification Search
CPC ............ G06F 12/0875; G06F 15/7839; G06F 17/30905; G06F 2209/541; G06F 2212/455; G06F 12/0888
See application file for complete search history.

(56) References Cited

U.S. PATENT DOCUMENTS

| | | | |
|---|---|---|---|
| 2003/0229884 A1* | 12/2003 | Carr | G06F 17/30306 717/101 |
| 2005/0131962 A1* | 6/2005 | Deshpande | G06F 17/30244 |
| 2005/0149924 A1* | 7/2005 | Komarla | G06F 9/4416 717/176 |
| 2011/0246721 A1* | 10/2011 | Crisan | G06F 11/1464 711/130 |
| 2012/0082395 A1* | 4/2012 | Abdo | H04N 19/13 382/239 |
| 2012/0254804 A1* | 10/2012 | Sheha | G06Q 30/02 715/834 |

* cited by examiner

*Primary Examiner* — Hashem Farrokh
(74) *Attorney, Agent, or Firm* — Jackson Walker L.L.P.

(57) ABSTRACT

In accordance with these and other embodiments of the present disclosure, an information handling system may include a processor and a program of instructions embodied in non-transitory computer-readable media. The program of instructions may be configured to, when read and executed by the processor: (i) upon an end of a user session on a client information handling system, store a session cache associated with a graphics image cache of a user session; and (ii) based on the session cache, generate a cache for upload at commencement of next user session to be applied as the graphics image cache of a subsequent user session.

14 Claims, 2 Drawing Sheets

SYSTEMS AND METHODS FOR PRE-POPULATION OF GRAPHICS IMAGE CACHE IN VIRTUAL DESKTOP ENVIRONMENT

TECHNICAL FIELD

The present disclosure relates in general to pre-population of an graphics image cache in a virtual desktop environment of an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems have utilized virtual desktop infrastructure (VDI), server-based computing (SBC), or other virtual desktop environments that use desktop virtualization software technology to separate a desktop environment and the associated application software from the physical client device that is used to access it. In some virtual desktop environments, users may face poor end-user experience as a result of limited network bandwidth availability between a user endpoint device and a location at which a virtual desktop environment resides (e.g., in a corporate datacenter).

SUMMARY

In accordance with the teachings of the present disclosure, the disadvantages and problems associated with user experience in a virtual desktop environment may be substantially reduced or eliminated.

In accordance with embodiments of the present disclosure, a method may include upon an end of a user session on a client information handling system, storing a session cache associated with a graphics image cache of a user session. The method may further include based on the session cache, generating a cache for upload at commencement of next user session to be applied as the graphics image cache of a subsequent user session.

In accordance with these and other embodiments of the present disclosure, an information handling system may include a processor and a program of instructions embodied in non-transitory computer-readable media. The program of instructions may be configured to, when read and executed by the processor: (i) upon an end of a user session on a client information handling system, store a session cache associated with a graphics image cache of a user session; and (ii) based on the session cache, generate a cache for upload at commencement of next user session to be applied as the graphics image cache of a subsequent user session.

In accordance with these and other embodiments of the present disclosure, an article of manufacture may include a non-transitory computer-readable medium and computer-executable instructions carried on the computer-readable medium, the instructions readable by a processor. The instructions, when read and executed, may cause the processor to: (i) upon an end of a user session on a client information handling system, store a session cache associated with a graphics image cache of a user session; and (ii) based on the session cache, generate a cache for upload at commencement of next user session to be applied as the graphics image cache of a subsequent user session.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
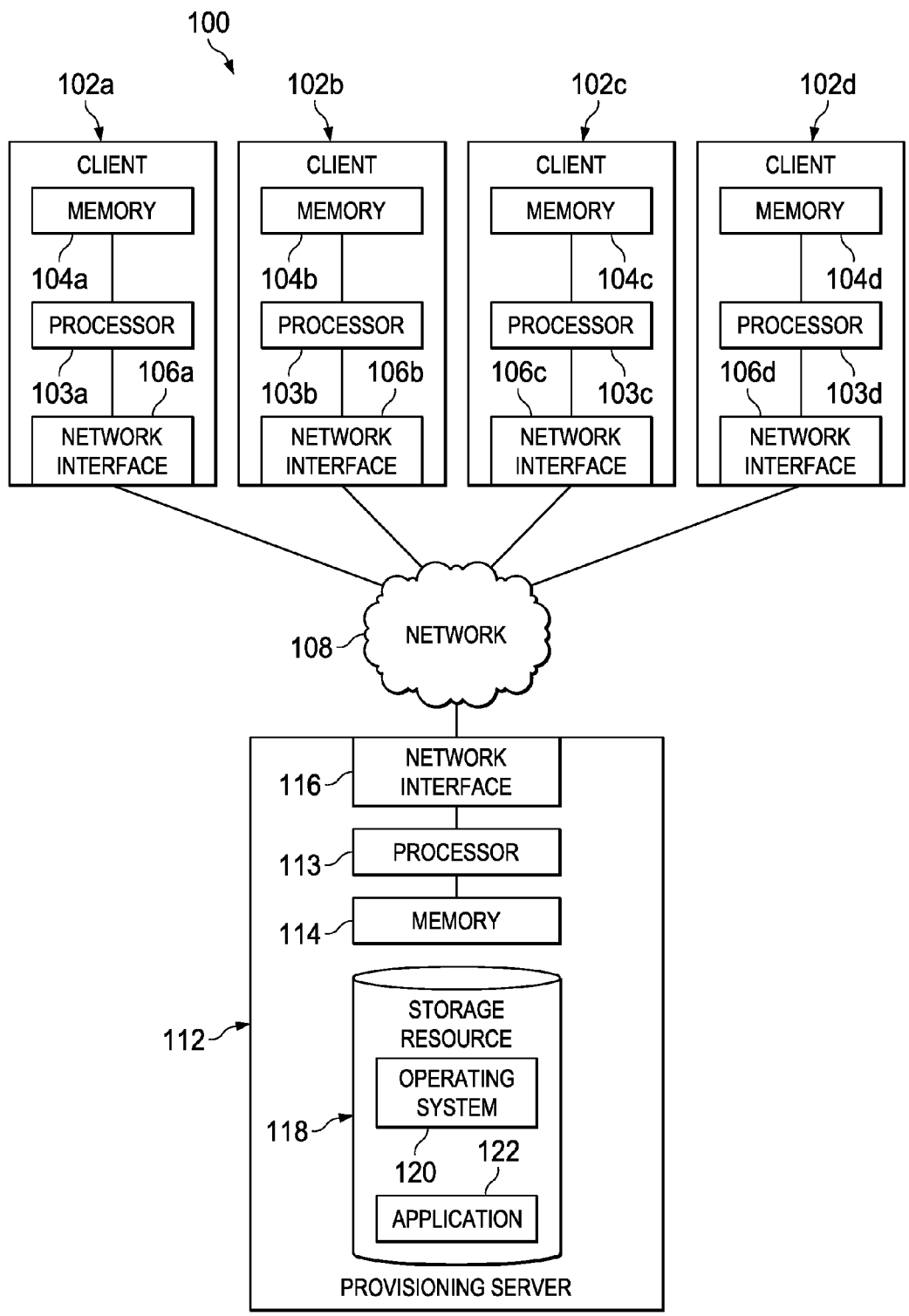
FIG. 1 illustrates a block diagram of an example system for implementing a virtual desktop environment, in accordance with the embodiments of the present disclosure.
Figure 2:
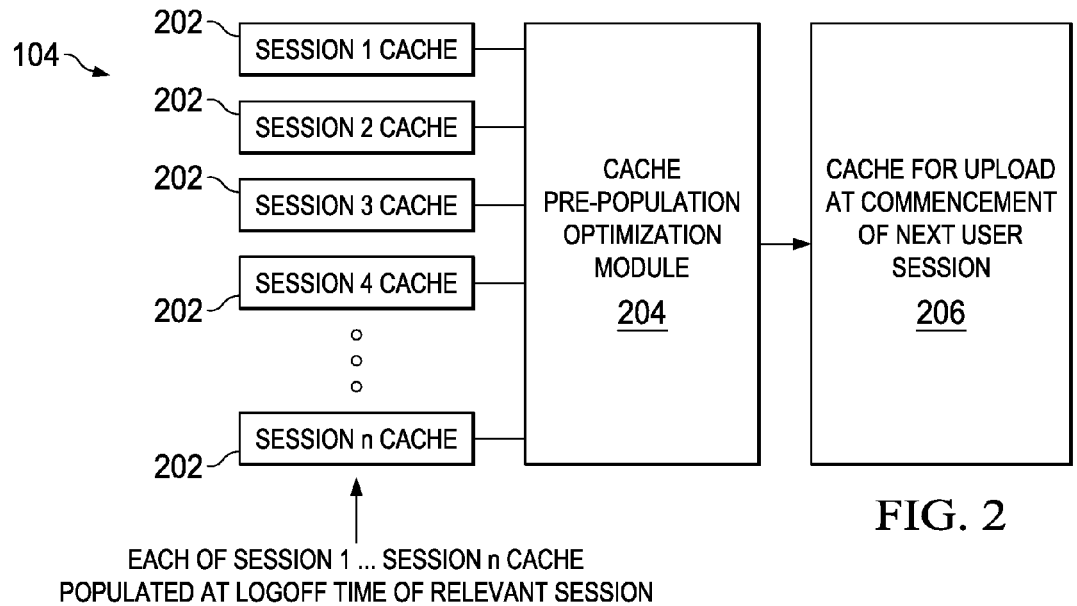
FIG. 2 illustrates example memory contents of a client information handling system, in accordance with the embodiments of the present disclosure.
Figure 3:
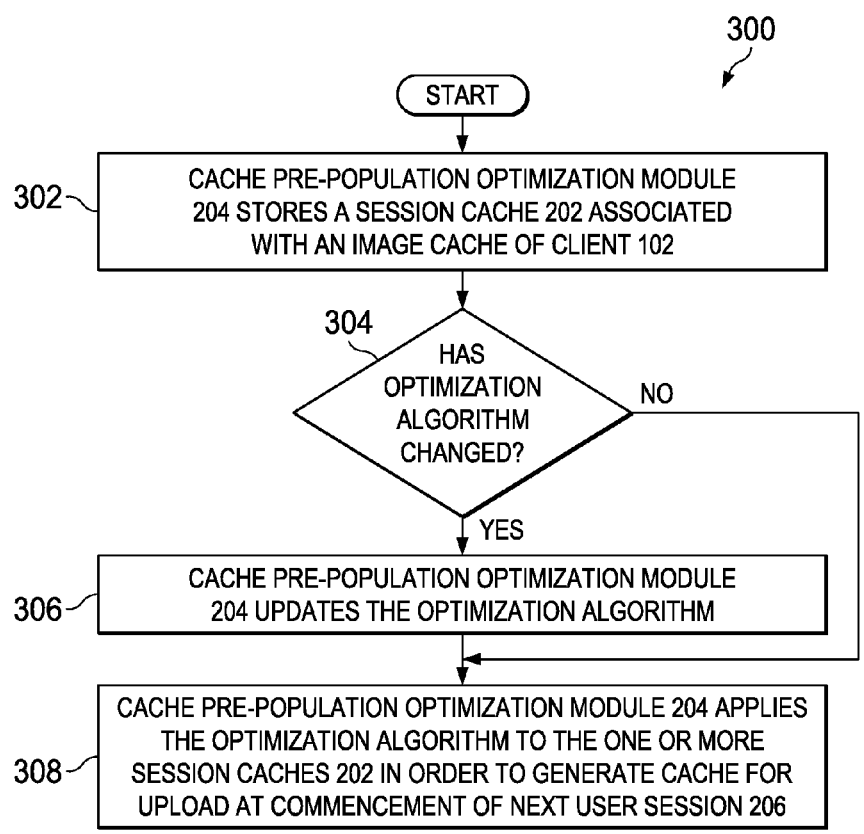
FIG. 3 illustrates a flow chart of an example method for pre-population of a graphics image cache in a virtual desktop environment, in accordance with embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

An information handling system may include or may be coupled via a network to one or more arrays of storage resources. The array of storage resources may include a plurality of storage resources, and may be operable to perform one or more input and/or output storage operations, and/or may be structured to provide redundancy. In operation, one or more storage resources disposed in an array of storage resources may appear to an operating system as a single logical storage unit or "logical unit."

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example system 100 for implementing a virtual desktop environment, in accordance with the embodiments of the present disclosure. As depicted, system 100 may include one or more clients 102, a network 108, and a provisioning server 112.

Each client 102 may comprise an information handling system and may generally be configured to communicate via network 108 with provisioning server 112. In certain embodiments, one or more of clients 102 may be a server. In another embodiment, one or more of clients 102 may be a personal computer (e.g., a desktop computer or a portable computer). As depicted in FIG. 1, each client 102 may include a processor 103, a memory 104 communicatively coupled to processor 103, and a network interface 106 communicatively coupled to processor 103. Although system 100 is depicted as having four clients 102, system 100 may include any suitable number of clients 102.

Each processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 118 and/or another component of system 100.

Each memory 104 may be communicatively coupled to its associated processor 103 and may include any system, device, or apparatus configured to retain program instructions and/or data for a period of time (e.g., computer-readable media). Each memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated client 102 is turned off.

Each network interface 106 may include any suitable system, apparatus, or device operable to serve as an interface between its associated client 102 and network 108. Each network interface 106 may enable its associated client 102 to communicate over network 108 using any suitable transmission protocol and/or standard, including without limitation all transmission protocols and/or standards enumerated below with respect to the discussion of network 108.

In addition to processor 103, memory 104, and network interface 106, a client 102 may include one or more other information handling resources.

Network 108 may be a network and/or fabric configured to couple clients 102 and provisioning server 112 to one another. In some embodiments, network 108 may include a communication infrastructure, which provides physical connections, and a management layer, which organizes the physical connections, clients 102, and provisioning server 112. In the same or alternative embodiments, network 108 may allow block I/O services and/or file access services to storage resource 118 of provisioning server 112. Network 108 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data, and/or messages (generally referred to as data). Network 108 may transmit data using any storage and/or communication protocol, including without limitation, Fibre Channel, Frame Relay, Asynchronous Transfer Mode (ATM), Internet protocol (IP), other packet-based protocol, small computer system interface (SCSI), advanced technology attachment (ATA), serial ATA (SATA), advanced technology attachment packet interface (ATAPI), serial storage architecture (SSA), integrated drive electronics (IDE), and/or any combination thereof. Network 108 and its various components may be implemented using hardware, firmware, software, or any combination thereof.

Provisioning server 112 may comprise an information handling system and may generally be operable to communicate via network 108 with one or more of clients 102. In operation, provisioning server 112 may manage the access of one or more clients 102 to operating system 120 and/or applications 122 of provisioning server 112, as described in greater detail elsewhere in this disclosure. As depicted in FIG. 1, each provisioning server 112 may include a processor 113, a memory 114 communicatively coupled to processor 113, a network interface 116 communicatively coupled to processor 113, and a storage resource 118. Each processor 113, memory 114, and network interface 116 may be similar or identical in structure and/or functionality to processor 103, memory 104, and network interface 106, respectively. Although system 100 is depicted as having one provisioning server 112, system 100 may include any suitable number of provisioning servers 112. Also, although system 100 is depicted as having storage resource 118 internal to provisioning server 112, in some embodiments, storage resource 118 may be external to provisioning server 112 (e.g., embodied by a physical array of external hard disk drives).

Storage resource 118 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 118 may comprise a plurality of physical storage resources that may appear to an operating system executing on provisioning server 112 as a single logical storage unit or virtual storage resource. For example, each such virtual storage resource may comprise a Redundant Array of Individual Disks (RAID).

As shown in FIG. 1, storage resource 118 may have stored thereon an operating system 120 and an application 122. Operating system 120 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 120. To provide for a virtual desktop environment, active portions of operating system 120 may be transferred from storage resource 118 of provisioning server 112 via network 108 to a memory 104 of a client 102 for execution by processor 103 of such client 102.

Application 122 may comprise any program of executable instructions, or aggregation of programs of executable instructions, configured to, when read and executed by processor 103, interact with operating system 120 in order to perform a group of coordinated functions, tasks, or activities. In connection with a virtual desktop environment, active portions of application 122 may be transferred from storage resource 118 of provisioning server 112 to memory 114 of provisioning server 112.

In addition to processor 113, memory 114, network interface 116, and storage resource 118, a provisioning server 112 may include one or more other information handling resources.

FIG. 2 illustrates example memory contents of a client 102, in accordance with the embodiments of the present disclosure. As shown in FIG. 2, memory 104 may have stored thereon a cache pre-population optimization module 204. Cache pre-population optimization module 204 may comprise any program of executable instructions, or aggregation of programs of executable instructions, configured to, when read and executed by processor 103, perform tasks to generate a cache for upload at commencement of next user session 206, as described in greater detail below, based on one or more previous user session caches 202. In some embodiments, cache pre-population optimization module 204 may comprise all or a portion of an application 122 executing on client 102, a portion of operating system 120 executing on client 102, or a standalone application stored on a computer-readable medium integral or external to client 102. In operation, at the end of each user session of a client 102, cache pre-population optimization module 204 may store a session cache 202 in memory 104. In addition, at the end of each user session of a client 102, cache pre-population optimization module 204 may, as described in greater detail below, generate a cache for upload at commencement of next user session 206. Such cache for upload at commencement of next user session 206 may then be used in a subsequent user session to pre-populate a graphics image cache for such user, potentially leading to a positive user experience.

Although FIG. 2 shows cache pre-population optimization module 204 may execute from memory 104 on processor 103, in some embodiments, cache pre-population optimization module 204 executing from memory 114 on processor 113 of provisioning server 112. In addition, in some embodiments, a session cache 202 may be uploaded to provisioning server 112 at the end of each user session and stored on provisioning server 112, where it may be processed by cache pre-population optimization module 204 along with other previous session caches 202 stored on provisioning server 112 to generate a cache for upload at commencement of next user session 206. In these and other embodiments, when generated, a cache for upload at commencement of next user session 206 may be stored on provisioning server 112 and downloaded by a client 102 upon commencement of a user's next session at a client 102.

FIG. 3 illustrates a flow chart of an example method 300 for pre-population of a graphics image cache in a virtual desktop environment, in accordance with embodiments of the present disclosure. According to one embodiment, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, at the conclusion of a user session at a client 102 (e.g., when a user at a client 102 logs off), cache pre-population optimization module 204 may store a session cache 202 associated with a graphics image cache of the client 102. At step 304, cache pre-population optimization module 204 may determine if an optimization algorithm has changed. An optimization algorithm may be any series of steps that applies a set of optimization rules to generate a cache for upload at commencement of next user session 206 for one or more session caches 202. For example, an algorithm may weight towards content of more recently-used session cache information, weight towards indications of frequency of use in session caches 202, and/or consider a temporal parameter (e.g., month, day, day of week, time of day, etc.) associated with one or more session caches 202. If an optimization algorithm has been changed, method 300 may proceed to step 306. Otherwise, method 300 may proceed to step 308.

At step 306, cache pre-population optimization module 204 may update the optimization algorithm. After step 306, method 300 may proceed to step 308.

At step 308, cache pre-population optimization module 204 may apply the optimization algorithm to the one or more session caches 202 in order to generate cache for upload at commencement of next user session 206. After step 308, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using information handling system 100 or any other system operable to implement method 300. In certain embodiments, method 300 may be implemented partially or fully in software and/or firmware embodied in computer-readable media and executable on a processor of information handling system 100.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A client management method comprising:
    managing access, of a client information handling system coupled to a provisioning server via a network, to resources including:
        an operating system stored in a storage resource of the provisioning server; and
        an application program stored on the storage resource of the provisioning server, wherein the application program includes a cache pre-population optimization module;
    copying active portions of the operating system from the storage resource of the provisioning server to a memory of the client information handling system;
    responsive to detecting an end of a user session on the client information handling system, performing session cache operations including:
        storing a graphics image cache associated with the user session as a session cache corresponding to the user session wherein, after detecting endings of a plurality of user sessions, a corresponding plurality of session caches have been stored;
        executing the cache pre-population optimization module to identify a particular session cache in the plurality of session caches as a next session cache; and
        storing the next session cache on a storage resource of the provisioning server; and
    responsive to detecting commencement of the next user session, pre-populating the graphics image cache of the client information handling system with the next session cache.

2. The method of claim 1, further comprising:
    determining whether an optimization algorithm of the cache pre-population optimization module has changed; and
    updating the optimization algorithm before identifying the particular cache session as the next session cache.

3. The method of claim 2, wherein the optimization algorithm identifies the particular session cache as the next session cache based on frequency of use indications in the plurality of session caches.

4. The method of claim 2, wherein the optimization algorithm identifies the particular session cache as the next session cache based on one or more temporal parameters associated with the plurality of session caches.

5. The method of claim 4, wherein the one or more temporal parameters include a month parameter.

6. The method of claim 4, wherein the one or more temporal parameters include a day parameter.

7. The method of claim 4, wherein the one or more temporal parameters include a day of week parameter.

8. The method of claim 4, wherein the one or more temporal parameters include a time of day parameter.

9. A provisioning server configured for use in a virtual desktop environment, the provisioning server comprising:
    a processor; and
    a program of instructions embodied in non-transitory computer-readable media, and configured to, when read and executed by the processor perform management operations comprising:
        managing access, of a client information handling system coupled to the provisioning server via a network, to resources including:
            an operating system stored in a storage resource of the provisioning server; and
            an application program stored on the storage resource of the provisioning server, wherein the application program includes a cache pre-population optimization module;
        copying active portions of the operating system from the storage resource of the provisioning server to a memory of the client information handling system;
        responsive to detecting an end of a user session on the client information handling system, performing session cache operations including:
            storing a graphics image cache associated with the user session as a session cache corresponding to the user session wherein, after detecting endings of a plurality of user sessions, a corresponding plurality of session caches have been stored;
            executing the cache pre-population optimization module to identify a particular session cache in the plurality of session caches as a next session cache; and
            storing the next session cache on a storage resource of the provisioning server; and
        responsive to detecting commencement of the next user session, pre-populating the graphics image cache of the client information handling system with the next session cache.

10. The provision server of claim 9, wherein the management operations include:
    determining whether an optimization algorithm of the cache pre-population optimization module has changed; and
    updating the optimization algorithm before identifying the particular cache session as the next session cache.

11. The provision server of claim 9, wherein the optimization algorithm identifies the particular session cache as the next session cache based on frequency of use indications in the plurality of session caches.

12. An article of manufacture comprising:
a non-transitory computer-readable medium; and
computer-executable instructions carried on the computer-readable medium, the instructions readable by a processor, the instructions, when read and executed, for causing the processor to perform operations comprising:
managing access, of a client information handling system coupled to the provisioning server via a network, to resources including:
an operating system stored in a storage resource of the provisioning server; and
an application program stored on the storage resource of the provisioning server, wherein the application program includes a cache pre-population optimization module;
copying active portions of the operating system from the storage resource of the provisioning server to a memory of the client information handling system;
responsive to detecting an end of a user session on the client information handling system, performing session cache operations including:
storing a graphics image cache associated with the user session as a session cache corresponding to the user session wherein, after detecting endings of a plurality of user sessions, a corresponding plurality of session caches have been stored;
executing the cache pre-population optimization module to identify a particular session cache in the plurality of session caches as a next session cache; and
storing the next session cache on a storage resource of the provisioning server; and
responsive to detecting commencement of the next user session, pre-populating the graphics image cache of the client information handling system with the next session cache.

13. The article of claim 12, wherein the management operations comprise:
determining whether an optimization algorithm of the cache pre-population optimization module has changed; and
updating the optimization algorithm before identifying the particular cache session as the next session cache.

14. The article of claim 13, wherein the optimization algorithm identifies the particular session cache as the next session cache based on frequency of use indications in the plurality of session caches.

* * * * *